Patented Feb. 23, 1937

2,071,327

UNITED STATES PATENT OFFICE 2,071,327

PROCESS OF RACEMIZING AMINO ACIDS

Rudolph S. Bley, Elizabethton, Tenn.

No Drawing. Application August 15, 1935, Serial No. 36,439

15 Claims. (Cl. 260—108)

The present invention relates to a process of optically inactivating laevo- and dextro-amino acids to racemic or d-, l-amino acids which subsequently may be recovered in pure form.

All amino acids, obtained from proteins by acid hydrolysis or by the action of digestive enzymes, are optically active with the exception of amino-acetic acid, since this compound has only one isomer.

According to Van't Hoff's theory, such substances are optically active which contain an asymmetric carbon atom. Compounds which rotate the plane of polarized light to the left are called laevo-rotatory or l-compounds. On the other hand, compounds which have the property of rotating the plane of polarized light to the right are dextro-rotatory or d-compounds. When, for example, equal amounts of laevo- and dextro-amino acids are mixed, the resulting composition of amino acids will be optically inactive, and special methods must be used to resolve these racemic or d-, l-compounds into their active constituents. Amino acids, obtained by synthetic methods, are generally optically inactive and their constituents may be isolated with several methods. Pasteur introduced for this purpose alkaloids, such as l-cinchonine, which forms two salts namely (a) d-acid plus l-base, and (b) l-acid plus l-base. These two salts are not enantiomorphously related, and thus may be separated by fractional crystallization.

One object of my present invention is a process of racemizing active amino acids in a simple and inexpensive manner.

It is already known in the art to racemize active amino acids by means of alkalies at low temperatures but this method is unreliable, expensive and time-consuming. Dakin (J. Bio. Chem.; vol. XIII, 1912, page 357, and vol. XV, 1913, page 263), offers the following explanation for the phenomena of racemization: "While salts of the free amino acids cannot exhibit keto-enol isomerism, it is possible for certain groups of the peptide complex to exhibit keto-enol isomerism. Alanyl alanine, for example, under the influence of dilute alkali at low temperatures, may, by intramolecular rearrangement of the hydrogen atom attached to alpha-carbon atom, pass over to the oxygen atom of the adjacent ketone group, thus:

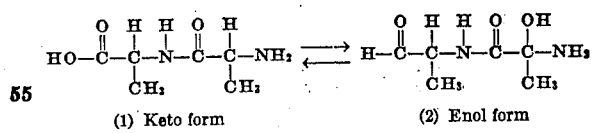

(1) Keto form      (2) Enol form

The keto and enol forms are probably in equilibrium, some keto going to the enol form and some enol to the keto form. While in the keto form the alpha-carbon atom of the second alanyl group is asymmetric, in the enol form it becomes symmetrical. When the enol form changes back to the keto form with its asymmetrical carbon atom, equal amounts of the two optical isomers will be formed, since there is nothing to determine that one isomer rather than the other shall be formed. The alkali must assist in producing the enol form in the peptide or larger molecular complex, and, thus, cause racemization; the terminal amino group containing a free carboxyl group would be unchanged."

In my opinion, during racemization of amino acids there is first produced from the active substance an active condensation product possessing a ring structure. This active condensation product immediately changes to a racemic condensation product possessing a ring structure too. It is racemic because the asymmetric carbon atom disappears. Both condensation products seem to be very unstable and, thus, the original compounds are formed in their racemic modification. This theory is substantiated by the fact that I have been able to isolate these intermediate products from amino acids by treating them with acetyl chloride and acetic acid.

Another object of my invention is a process of racemizing active amino acids with acetyl chloride in the presence of acetic acid.

I have found by experimentation that aliphatic amino acids (monoamino-monocarboxylic acids, monoamino-dicarboxylic acids, diamino-monocarboxylic acids), sulfur-containing amino acids, aromatic amino acids and heterocyclic amino acids in their d- and l-modifications, respectively, can be racemized in a short period of time by means of acetyl chloride and acetic acid. This novel racemization process is carried out in the following manner:

The amino acid is dissolved in 10% hydrochloric acid. Some amino acids, for example leucine, proline and tyrosine, however, are dissolved in about 20% hydrochloric acid. After dissolution the amino acid is filled into a 1 dcm. polariscope tube and its angle of rotation determined. Subsequently 1 g. of amino acid is dissolved and/or dispersed in a mixture consisting of 10 cc. of acetyl chloride and 10 cc. of concentrated acetic acid. The mixture is transferred into a glass tube the top portion of which is subsequently closed by melting the upper part of the tube together by means of a blast-burner. The sealed tube is gradually heated, preferably on a water bath, to about 100° C., the length of heating depending upon the type of amino acid treated. The tube is now opened and its liquid phase evaporated in vacuo. A few ccs. of hydrochloric acid are added to the residue, and in case the liquid shows discoloration it may be clarified with carbon black and the like. The clear liquid is then filled into a 1 dcm. polariscope tube and its specific rotation determined.

The results, obtained by racemizing various amino acids by means of acetyl chloride and acetic acid, are shown in the following table:

I. ALIPHATIC AMINO ACIDS

A. *Monoamino-monocarboxylic acids*

(1) d-Alanine:
  Specific rotation before treatment:
    Alpha $_{20}^{D}$: about $+11.4°$
  Specific rotation after 30 minutes of treatment: Alpha $_{20}^{D}$:0°.

(2) l-Leucine:
  Specific rotation before treatment:
    Alpha $_{20}^{D}$: about $-17.5°$
  Specific rotation after 30 minutes of treatment: Alpha $_{20}^{D}$:0°.

(3) d-Isoleucine:
  Specific rotation before treatment:
    Alpha $_{20}^{D}$: about $+33°$
  Specific rotation after 30 minutes of treatment: Alpha $_{20}^{D}$:0°.

(4) d-Valine:
  Specific rotation before treatment:
    Alpha $_{20}^{D}$: $+28.2°$
  Specific rotation after 30 minutes of treatment: Alpha $_{20}^{D}$:0°.

(5) l-Serine:
  Specific rotation before treatment:
    Alpha $_{20}^{D}$: $-14°$
  Specific rotation after 30 minutes of treatment: Alpha $_{20}^{D}$:0°.

B. *Monoamino-dicarboxylic acids*

(1) l-Aspartic acid:
  Specific rotation before treatment:
    Alpha $_{20}^{D}$: about $-25.7°$
  Specific rotation after 30 minutes of treatment: Alpha $_{20}^{D}$: $-0.1°$.
  Specific rotation after 3 hours of treatment: Alpha $_{20}^{D}$:0°.

(2) d-Glutamic acid:
  Specific rotation before treatment:
    Alpha $_{20}^{D}$: about plus $29.0°$
  Specific rotation after 30 minutes of treatment: Alpha $_{20}^{D}$: about $+1.0°$.
  Specific rotation after about 4 hours of treatment: Alpha $_{20}^{D}$:0°.

(3) d-Hydroxyglutamic acid:
  Specific rotation before treatment:
    Alpha $_{20}^{D}$: about $+16°$
  Specific rotation after 4 hours of treatment: Alpha $_{20}^{D}$:0°.

C. *Diamino-monocarboxylic acids*

(1) d-Arginine:
  Specific rotation before treatment:
    Alpha $_{20}^{D}$: about $+18°$
  Specific rotation after 2 hours of treatment: Alpha $_{20}^{D}$:0°.

(2) d-Lysine:
  Specific rotation before treatment:
    Alpha $_{20}^{D}$: about $+14.5°$
  Specific rotation after 2 hours of treatment: Alpha $_{20}^{D}$:0°.

D. *Sulfur-containing amino acids*

(1) l-Cystine:
  Specific rotation before treatment:
    Alpha $_{20}^{D}$: about $-205°$
  Specific rotation after 4 hours of treatment: Alpha $_{20}^{D}$:0°.

II. AROMATIC AMINO ACIDS (1) l-Tyrosine:
  Specific rotation before treatment:
    Alpha $_{20}^{D}$: $-8.1°$
  Specific rotation after 1 hour of treatment: Alpha $_{20}^{D}$:0°.

(2) l-Phenylalanine.
  Specific rotation before treatment:
    Alpha $_{20}^{D}$: about $-35°$
  Specific rotation after 4 hours of treatment: Alpha $_{20}^{D}$:0°.

III. HETEROCYCLIC AMINO ACIDS (1) l-Histidine:
  Specific rotation before treatment:
    Alpha $_{20}^{D}$: about $-1.8°$
  Specific rotation after 1 hour of treatment: Alpha $_{20}^{D}$:0°.

(2) l-Proline:
  Specific rotation before treatment:
    Alpha $_{20}^{D}$: about $-63°$
  Specific rotation after 2 hours of treatment: Alpha $_{20}^{D}$:0°.

(3) l-Tryptophane:
  Specific rotation before treatment:
    Alpha $_{20}^{D}$: about $-1.3°$
  Specific rotation after 4 hours of treatment: Alpha $_{20}^{D}$:0°.

(4) l-Hydroxyproline:
  Specific rotation before treatment:
    Alpha $_{20}^{D}$: about $-73°$.
  Specific rotation after 4 hours of treatment: Alpha $_{20}^{D}$:0°.

While I have found that l- and d-amino acids will be racemized by means of acetyl chloride and acetic acid already at normal room temperatures on standing for relatively long periods of time and that the racemization may be accelerated by heating the reacting compounds to temperatures somewhat higher than 100° C., I prefer to carry out my novel process at temperatures of about 100° C. I have also found, by experimentation, that the proportions of amino acid, acetyl chloride and acetic acid may be varied to some extent without affecting the final reaction product. While I prefer to use concentrated acetic acid, i. e., glacial acetic acid, diluted acetic acid may be employed although in this case the treatment has to be carried out for much longer periods of time. Moreover, it is to be noted that only small amounts of hydrochloric acid are required to dissolve or disperse the active amino acids and excessive amounts of hydrochloric acid should be avoided. The amount of hydrochloric acid, necessary for this purpose, varies according to the characteristics of the particular amino acid under treatment and has to be predetermined by blank tests.

After completion of the racemization process, the racemic amino acid may be recovered in pure form by various methods. The reaction product is heated, for example for several hours with dilute hydrochloric acid (10–20%), the acid finally evaporated and the residue dissolved in distilled water. Silver hydroxide may be added thereto to remove traces of residual hydrochloric acid, and excessive silver can be eliminated with hydrogen sulphide. The pure, racemic acid crystallizes out after filtration.

When l-tyrosine is caused to react with acetyl chloride and acetic acid and treated with hydrochloric acid as set forth above, the tyrosine rapidly dissolves and after a while a new substance crystallizes in the form of fine needles. This compound is easily water-soluble and has a melting point of about 244° C. When ammonia is added thereto, the acetyl group splits off and subsequently l-tyrosine crystallizes out. A careful quantitative analysis disclosed that the new compound has the formula $C_{11}H_{13}NO_4 \cdot HCl$. It is evidently the chlorhydrate of acetyl-l-tyrosine. When this compound is re-heated in the presence of acetyl chloride and acetic acid it becomes optically inactive or in other words racemic. This chlorhydrate of acetyl-l-tyrosine is probably the intermediate product formed in accordance with my theory of racemization set forth above. It is also possible to recover the amino acid by means of picrolonic acid by splitting up the initially formed picronolates.

The racemic amino acids, prepared in accordance with my present invention, may be used for subsequent resolution into d-, and l-modifications, respectively. It, thus, becomes possible to produce such optically active modifications from a given amino acid which otherwise are unobtainable. In order to produce from a d-amino acid, for example, its l-modification, the d-acid is first racemized and subsequently resolved into its l-modification. It is to be noted that amino acids, racemized with acetyl chloride and acetic acid, are valuable for therapeutic purposes. The process may also be used to purify commercial amino acids, and the new compound acetyl-l-tyrosine is especially adapted for producing pure l-tyrosine from crude tyrosine.

While I have found that the ingredients and proportions mentioned above give the desired results, I do not wish to be limited to the use of all of these ingredients, to these ingredients and no others, nor to the exact proportions, degrees of temperature and concentrations set forth above, since the omission of some ingredients or a slight variation of proportions, cited above, will not adversely affect the final products, although it may vary somewhat the relative characteristics of such products resulting from such variations. Modifications of the invention will manifest themselves to those skilled in the art, and I desire to include such of these coming within the scope of the appended claims. The statement in these claims to the effect that the amino acid is dissolved in hydrochloric acid is intended to embrace a true dissolution as well as a dispersion of the amino acid in hydrochloric acid.

I claim:
1. The process of racemizing an optically active amino acid comprising treating said amino acid with acetyl chloride in the presence of acetic acid.
2. The process of racemizing an optically active aliphatic amino acid having more than one optical isomer comprising treating said amino acid with acetyl chloride in the presence of acetic acid.
3. The process of racemizing an optically active aromatic amino acid comprising treating said amino acid with acetyl chloride in the presence of acetic acid.
4. The process of racemizing an optically active heterocyclic amino acid comprising treating said amino acid with acetyl chloride in the presence of acetic acid.
5. The process of racemizing an optically active amino acid comprising heating said amino acid to about 100° C. with acetyl chloride and concentrated acetic acid.
6. The process of racemizing an optically active aromatic amino acid comprising heating said amino acid to about 100° C. with acetyl chloride and concentrated acetic acid.
7. The process of racemizing an optically active aliphatic amino acid having more than one optical isomer comprising heating said amino acid to about 100° C. with acetyl chloride and concentrated acetic acid.
8. The process of racemizing an optically active amino acid containing sulfur comprising heating said amino acid to about 100° C. with acetyl chloride and concentrated acetic acid.
9. The process of racemizing an optically active amino acid comprising dissolving said amino acid in dilute hydrochloric acid and subsequently treating said dissolved amino acid with acetyl chloride in the presence of acetic acid.
10. The process of racemizing an optically active amino acid comprising dissolving said amino acid in dilute hydrochloric acid and subsequently treating said dissolved amino acid with acetyl chloride in the presence of concentrated acetic acid.
11. The process of racemizing an optically active amino acid comprising dissolving said amino acid in dilute hydrochloric acid and subsequently heating said dissolved amino acid with acetyl chloride in the presence of concentrated acetic acid to temperatures of about 100° C.
12. The process of racemizing an optically active amino acid comprising dissolving said amino acid in dilute hydrochloric acid and subsequently heating said dissolved amino acid with acetyl chloride in the presence of acetic acid to temperatures of about 100° C.
13. The process of racemizing an optically active amino acid comprising dissolving about 1 gram of said amino acid in a sufficient amount of about 10 to 20% hydrochloric acid, adding a mixture of about 10 cc. acetyl chloride and 10 cc. concentrated acetic acid thereto, sealing said amino acid-hydrochloric acid-acetyl chloride-acetic acid composition in a glass container and subsequently heating said container to about 100° C. until the specific rotation of said amino acid becomes zero.

14. A new chemical compound acetyl-1-tyrosine chlorhydrate having the formula

$C_{11}H_{13}NO_4 \cdot HCl$ and a melting point of about 244° C., said compound being obtained by causing acetyl chloride and concentrated acetic acid to react upon 1-tyrosine.

15. The process of racemizing an optically active amino acid comprising treating said amino acid with an acetyl halide in the presence of acetic acid.

RUDOLPH S. BLEY.